US006189900B1

(12) United States Patent
MacDonald

(10) Patent No.: US 6,189,900 B1
(45) Date of Patent: Feb. 20, 2001

(54) SMALL WATERCRAFT CART

(75) Inventor: Hugh T. MacDonald, Cromwell, CT (US)

(73) Assignee: MacDonald Industrial Services, Cromwell, CT (US)

( * ) Notice: Under 35 U.S.C. 154(b), the term of this patent shall be extended for 0 days.

(21) Appl. No.: 09/291,946

(22) Filed: Apr. 15, 1999

(51) Int. Cl.[7] ........ B62B 1/02

(52) U.S. Cl. ........ 280/47.331; 114/344; 280/414.2; 280/63; 414/445

(58) Field of Search ........ 114/344, 347; 414/444, 445, 460; 280/63, 414.1, 414.2, 414.3, 47.331, 47.131, 47.23, 47.24

(56) References Cited

U.S. PATENT DOCUMENTS

| | | | | |
|---|---|---|---|---|
| 1,109,520 | * | 9/1914 | Flower | 280/47.331 |
| 2,042,598 | | 6/1936 | Harvey . | |
| 2,540,279 | | 2/1951 | Mosier . | |
| 2,637,050 | * | 5/1953 | Oliver | 280/47.331 |
| 2,893,580 | * | 7/1959 | Fischer | 114/344 |
| 2,970,846 | | 2/1961 | Boston . | |
| 3,093,386 | | 6/1963 | Case . | |
| 3,164,392 | * | 1/1965 | Lane | 280/47.331 |
| 3,379,452 | | 4/1968 | Torrisi . | |
| 3,445,018 | | 5/1969 | Reagan . | |
| 4,214,774 | | 7/1980 | Kluge . | |
| 4,286,800 | | 9/1981 | Lomas . | |
| 4,422,665 | | 12/1983 | Hinnant . | |
| 4,579,357 | | 4/1986 | Webster . | |
| 4,712,803 | | 12/1987 | Garcia . | |
| 4,822,065 | | 4/1989 | Enders . | |
| 4,824,127 | | 4/1989 | Stamm . | |
| 4,852,895 | * | 8/1989 | Moffitt | 280/47.331 |
| 4,936,595 | | 6/1990 | Cunningham . | |
| 5,203,580 | | 4/1993 | Cunningham . | |
| 5,207,441 | | 5/1993 | Granbery . | |
| 5,261,680 | | 11/1993 | Freitus et al. . | |
| 5,320,371 | | 6/1994 | Levad . | |
| 5,348,327 | | 9/1994 | Gieske . | |
| 5,975,003 | * | 11/1999 | Manson | 114/344 |

* cited by examiner

*Primary Examiner*—Michael Mar
(74) *Attorney, Agent, or Firm*—Hoffman, Wasson & Gitler

(57) ABSTRACT

A cart for moving small watercraft, such as canoes or kayaks is provided. The cart supports one or two watercraft in a stacked configuration. The cart is constructed to be strong and durable, and provide an easy and simple way to load and move small watercraft. The cart is constructed from an arcuate metal tube having a pair of arms, one each extending from one end of the arcuate metal tube. The arms each support a wheel. The watercraft fits through the arcuate tube, and the bottom on the watercraft rests on the ends of the arcuate tube. The arcuate tube lies at an angle relative to the longitudinal axis of the watercraft with the middle of the arcuate tube resting on the top of the watercraft, forward of the part of the watercraft where the bottom of the watercraft rests on the ends of the arcuate tube. A second arcuate metal tube may be pivotally attached to the first arcuate tube. The two tubes are connected at their middle. When the tubes are coincident, one watercraft may be supported. When the second tube is pivoted 180° relative to the first tube, two watercraft can be carried simultaneously.

19 Claims, 5 Drawing Sheets

28 24 32 30 22 26 20

SMALL WATERCRAFT CART

BACKGROUND OF THE INVENTION

1. Field of the Invention

The present invention relates to a cart for moving small watercraft, such as canoes or kayaks. More particularly, the present invention relates to a cart which supports one or two watercraft in a stacked configuration. The cart is constructed to be strong and durable, and provide an easy and simple way to load and move small watercraft.

2. Description of the Prior Art

Devices for transporting watercraft over land have been around for years. For large watercraft, these devices are large and elaborate devices requiring considerable complexity to lift the watercraft onto the carrier.

On the other hand, the devices for transporting small watercraft over land need not be as complex. Numerous such devices, for moving boats, sailboards, and canoes are well known. For example, U.S. Pat. No. 4,214,774 (Kluge) discloses a disassemblable boat carrier and launcher. The carrier supports a boat so that it can be pulled by hand and launched in the water. The carrier may be disassembled for storage.

Similarly, U.S. Pat. Nos. 4,712,803, 5,207,441, and 5,348,327 (Garcia, Granbery and Gieske, respectively) teach various sailboard carriers. All of these carriers have elaborate securing means, parts holders, and/or complex collapsible structures.

Other devices have been designed for canoe transportation, such as set forth in U.S. Pat. No. 4,579,357 (Webster), U.S. Pat. No. 4,824,127 (Stamm), U.S. Pat. No. 4,936,595 and U.S. Pat. No. 5,203,580 (Cunningham), U.S. Pat. No. 5,261,680 (Freitus et al.), and U.S. Pat. No. 5,320,371 (Levad). The foregoing canoe carriers all utilize a rigid structure for supporting the canoe and some means, such as straps, to secure the canoe. The supporting structure is made from many different materials such as metal, wood and plastic, each of which has different strength and durability characteristics.

Other boat transporting means are taught in U.S. Pat. No. 4,422,665 (Hinnant), U.S. Pat. No. 3,445,018 (Reagan), U.S. Pat. No. 3,093,386 (Case), U.S. Pat. No. 4,822,065 (Enders), U.S. Pat. No. 2,540,279 (Mosier), U.S. Pat. No. 2,970,846 (Boston), U.S. Pat. No. 4,286,800 (Lomas) and U.S. Pat. No. 3,379,452 (Torrisi). The carriers disclosed in the foregoing patents are either designed to be pulled behind cars or for supporting substantial boats. As a result, these carriers are made from a considerable number of parts, have elaborate structures, and require that the boat be lifted into place on the carrier.

The foregoing carriers all have drawbacks. The carriers are complex, requiring many parts and significant labor to assemble and/or employ. The carriers require the boat be lifted into place, which is a cumbersome task, and often requires more than one person. Some of the carriers are not themselves transportable in an automobile, for moving the watercraft from the automobile to the water. Most of the carriers employ securing straps, which in turn complicates the process of moving the watercraft, and adds more parts which may break. The more complex the device, the more likely it will break. Finally, the durability of the carriers are directly related to the materials used.

From the foregoing, it is an object of the present invention to provide a watercraft cart which has a simple construction, and requires a minimum number of parts.

Another object of the present invention is to provide a watercraft cart which does not require the watercraft be lifted onto the cart.

Yet another object of the present invention is to provide a watercraft cart which is durable and is made predominantly from metal.

Still another object of the present invention is to provide a watercraft cart which holds the watercraft in place due to the weight of the watercraft, and does not require straps or other securing devices.

Another object of the present invention is to provide a watercraft cart which can support more than one watercraft.

SUMMARY OF THE INVENTION

These and other deficiencies of the prior art are addressed by the present invention, which is directed to a cart for small watercraft, the carts being constructed from an arcuate metal tube. The tube has a pair of arms, one each extending from one end of the arcuate metal tube. The arms each support a wheel. The watercraft fits through the arcuate tube, and the bottom of the watercraft rests on the ends of the arcuate tube. The arcuate tube lies at an angle relative to the longitudinal axis of the watercraft with the middle of the arcuate tube resting on the top of the watercraft, forward of the part of the watercraft where the bottom of the watercraft rests on the ends of the arcuate tube. A second arcuate metal tube may be pivotally attached to the first arcuate tube. The two tubes are connected at their middle. When the tubes are coincident, one watercraft may be supported. When the second tube is pivoted 180° relative to the first tube, two watercraft can be carried simultaneously.

BRIEF DESCRIPTION OF THE DRAWINGS

These and other attributes of the present invention will be described with respect to the following drawings in which.

DETAILED DESCRIPTION OF THE INVENTION

Figure 1:
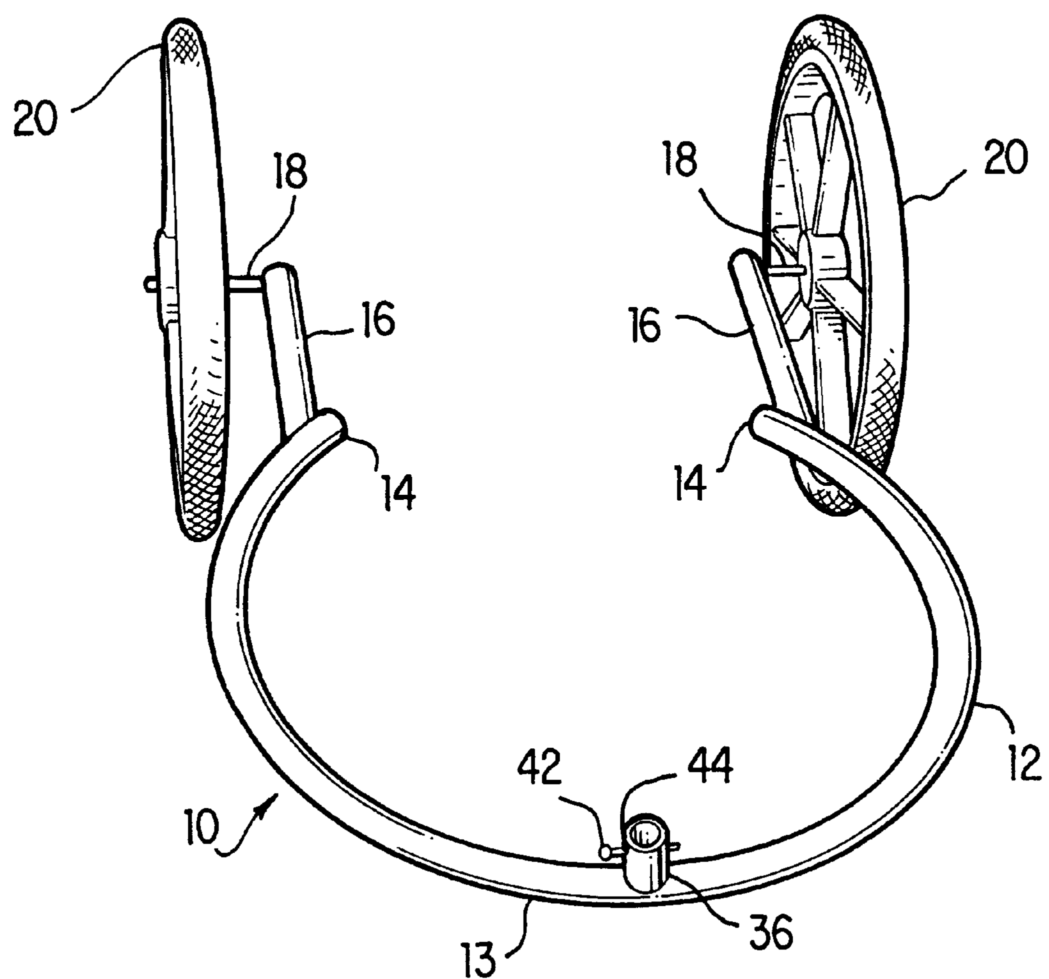
FIG. 1 is a perspective view of a first embodiment of the watercraft cart embodying the invention, configured to support a single watercraft.
Figure 2:
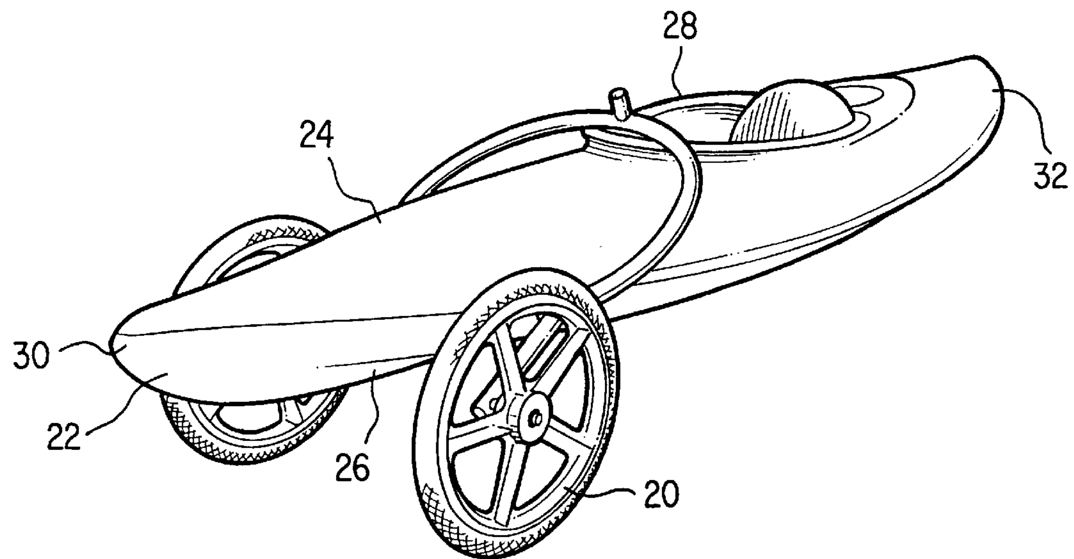
FIG. 2 is a perspective view of the watercraft cart shown in FIG. 1, supporting a kayak.

Referring to FIGS. 1 and 2, a first embodiment of the watercraft cart 10 according to the present invention is shown. The cart includes an arcuate metal tube 12 which is approximately 270° of a circle. An arm 16 extends from each end 14 of the arcuate tube 12, and lies in the same plane as the arcuate tube 12. A pair of axles 18 extend, one each, from the end of one of the arms 16. The axles 18 extend away from one another, and also lie in the same plane as the arms 16 and arcuate tube 12. A pair of wheels 20 are provided. One wheel 20 is placed on each axle 18.

The arcuate tube 12 and arms 16 are formed from tubes of metal such as steel. Alternatively, the tubes may be made from other rigid and strong materials such as wood or composites. Furthermore, while the tube 12 and arms 16 have a circular cross-section, they may have other cross-sections, such as a polygon, including, but not limited to, triangular, square, semicircular, etc.

From the previous description, the watercraft cart 10 of the present invention is of very simple construction. No straps or other elements are needed. In use, an end of a watercraft 22, such as a kayak is raised off the ground. The opposite and of the kayak remains on the ground, and the entire kayak does not need to be lifted off the ground at any time. Next, cart 10 is moved around the kayak 22, so that the center 13 of the arcuate tube 12 is positioned above the top 24 of the kayak 22. The bottom 26 of the kayak 22 rests on the laterally spaced ends 14 of the arcuate tube 12. The cart 10 is then rotated about the point where the ends 14 and the bottom 26 of the kayak 22 meet. The center 13 of the arcuate tube 12 is moved toward the middle of the kayak 28 so that center 13 rests on the top 24 of the kayak 22. Simultaneously, the arms 18 move so that they are nearer the end 30 of the kayak.

Once properly positioned, the opposite end 32 of the kayak 22 is lifted and the kayak 22 can be rolled on the wheels 20. The plane formed by the arcuate tube 12 and the arms 16 of the cart 10 is at an acute angle relative to the longitudinal axis A—A of the kayak 22, so that the weight of the kayak 22 is on the ends 14 of the arcuate tube 12. The angle of the plane of the cart 10 relative to the longitudinal axis of the watercraft 22 is determined by the height of the watercraft 22 and the size of the arcuate tube 12.

The tube 12 is arcuate, rather than circular, to allow room or clearance for watercraft hulls of different shapes. If the watercraft is a kayak, as illustrated, which has a substantially smooth bottom 26, then a tube 12 forming a complete circle would not interfere. However, if the bottom 26 is angular, the arcuate tube 12 permits any portion of the bottom 26 of the kayak 22 to lie between the ends 14. The arms 16 are provided to move the wheels further from the ends 14 of the arcuate tube 12 so as to provide clearance between the bottom 26 of the watercraft and the ground.

Figure 3:
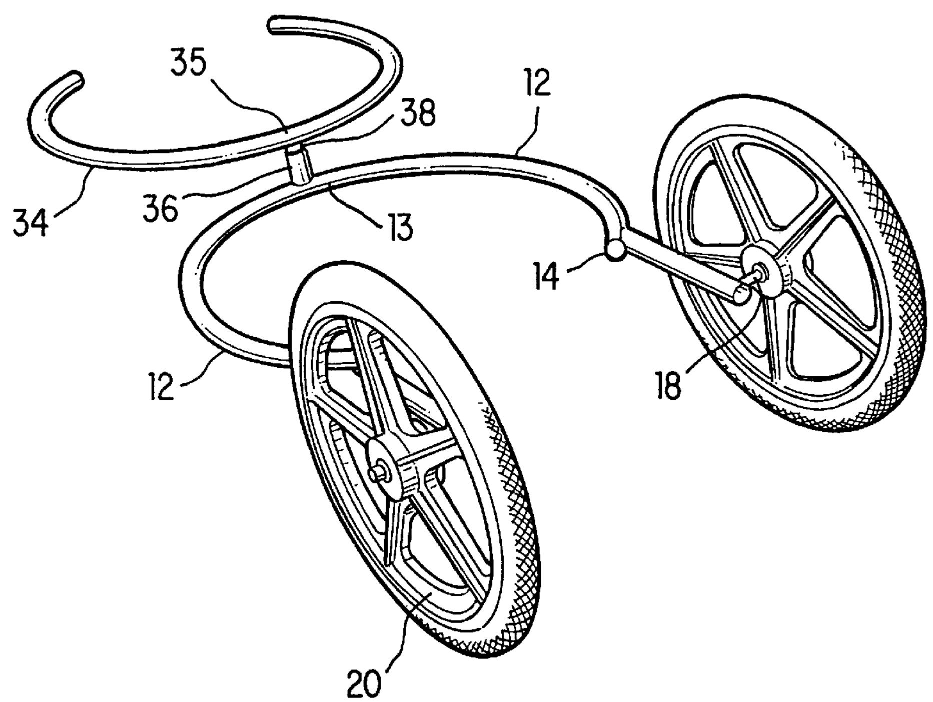
FIGS. 3 and 4 are perspective views of the watercraft cart embodying the invention, configured to support two watercraft.
Figure 4:
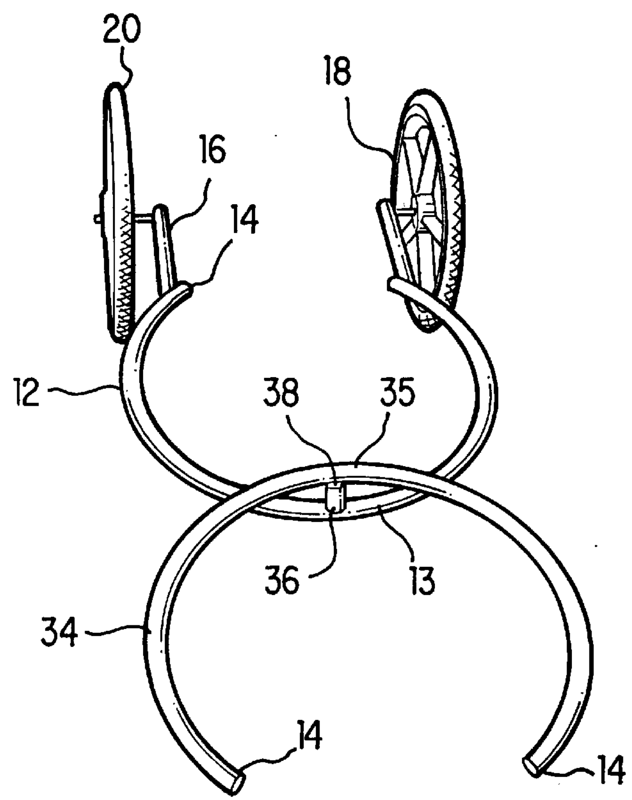

Turning now to FIGS. 3 and 4, a second embodiment of the present invention is shown. The second embodiment includes all of the elements of the first embodiment, shown in FIGS. 1 and 2, and includes a second arcuate tube 34. The two arcuate tubes 12 and 34 are connected at their centers 13 and 35, respectively. Each arcuate tube 12 and 34 has a short projecting tube 36 and 38, extending perpendicularly from a plane of the arcuate tube 12 and 34. One of the projecting tubes 36 and 38 has an outer diameter equal to the inner diameter of the other one of the projecting tubes 36 and 38. As a result, the smaller diameter one of the projecting tubes 36 and 38 fits inside the larger of the projecting tubes 36 and 38.

In FIGS. 3 and 4 the arcuate tubes 12 and 34 are positioned so that their respective ends 14 are 180° from one another. The second arcuate tube 34 does not have arms 16. The projecting tubes 36 and 38 may be prevented from rotating, relative to one another, by bolt 42 extending through holes 44 formed in the sides of the projecting tubes 36 and 38. Alternatively, while the projecting tubes 36 and 38 are shown as being circular in cross-section, they may have other cross-sections. For example, as shown in FIGS. 8*a–e* the projecting tubes may be oval, square or have some other polygonal shape. In fact, oval, square, rectangular, hexangular, or octangular are preferred. In such configurations, the two arcuate tubes 12 and 34 cannot rotate relative to one another after they are connected.

Figure 5:
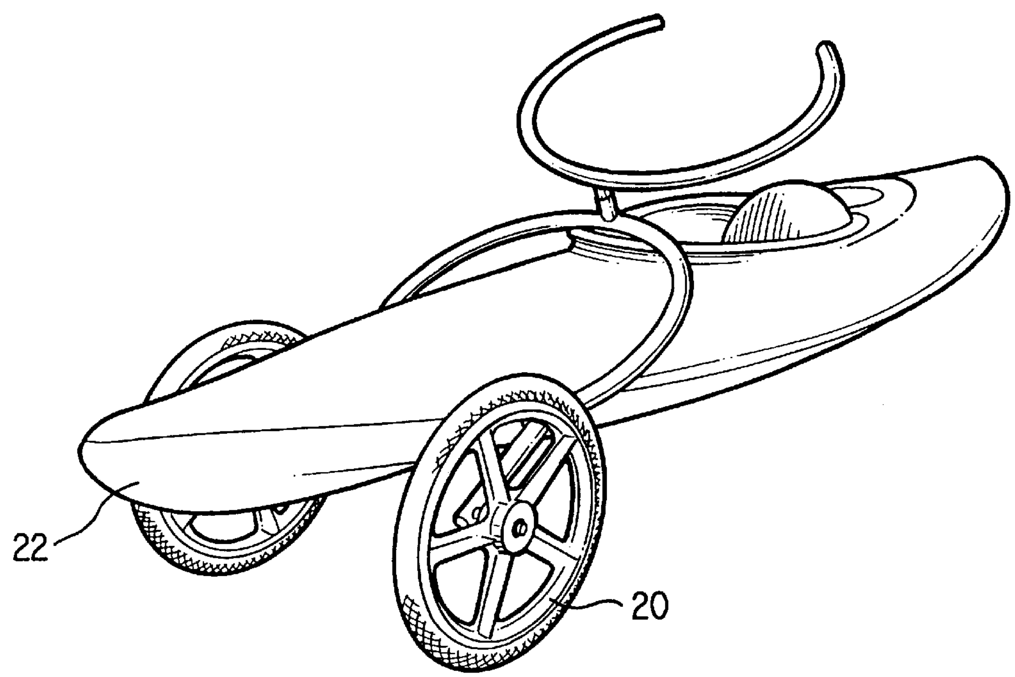
FIG. 5 is a perspective view of the watercraft cart shown in FIGS. 3 and 4, supporting one kayak in the lower berth according to the invention.
Figure 6:
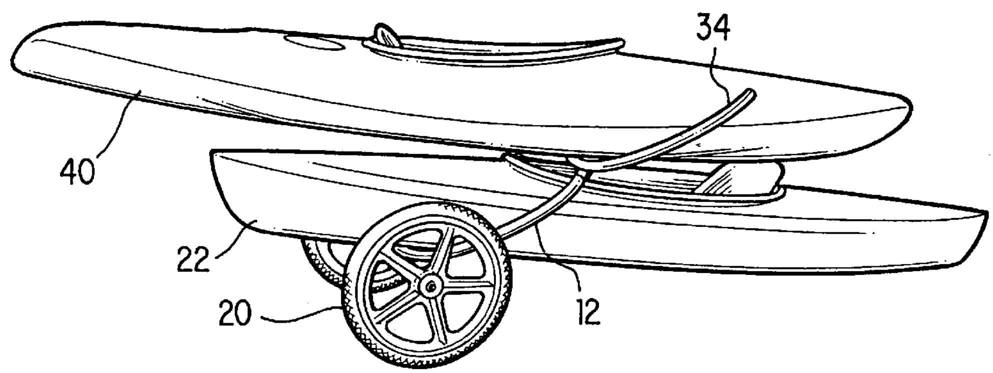
FIG. 6 is a perspective view of the watercraft cart shown in FIGS. 3–5, supporting two kayaks in the upper and lower berths according to the invention.

FIG. 5 shows a kayak 22 inserted in the lower berth formed by the arcuate tube 12, with the second arcuate tube 34 extending upwards. The kayak 22 is inserted in the same manner as described previously with regard to the first embodiment. FIG. 6 shows two kayaks 22 and 40 supported by the cart 10. One kayak 22 is supported in the lower berth formed by the arcuate tube 12, and a second kayak 40 is supported in an upper berth formed by the second arcuate tube 34. The arcuate tubes 12 and 34 and the arms 16 still lie in substantially the same plane despite the offset created by the projecting tube 36 and 38. The second kayak 40 has its bottom 26 resting on the center of the arcuate tube 34 and the ends 14 of the arcuate tube 34 lie on the top 24 of the kayak 40.

By lifting one end of the lower kayak 22 off the ground, the two kayaks 22 and 40 can be easily moved.

Figure 7:
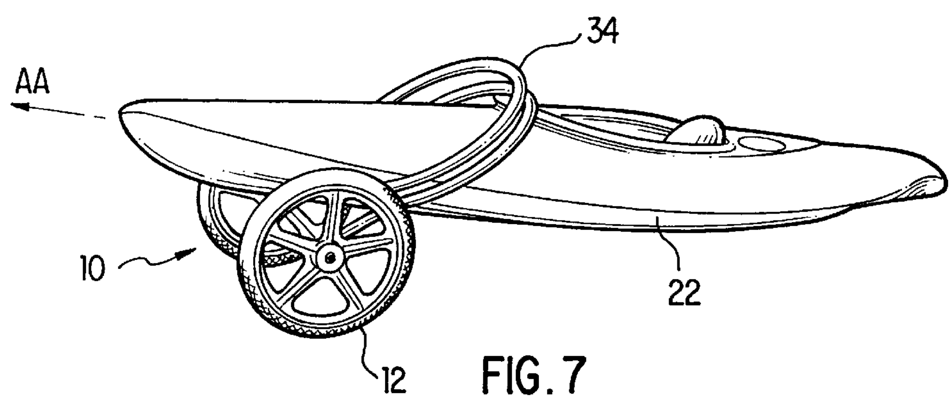
FIG. 7 is a perspective view of the watercraft cart shown in FIGS. 3 and 4, configured so that the upper kayak supporting structure coincides with the lower berth, and supporting a single kayak in the lower berth according to the invention.
Figure 8A:
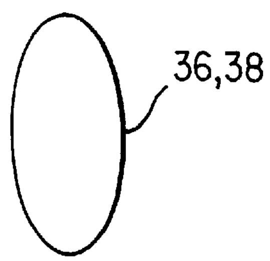
FIGS. 8*a–e* are cross-sectional views of projecting tubes for the second embodiment shown in FIGS. 3–7.
Figure 8B:
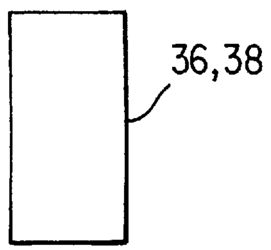
Figure 8C:
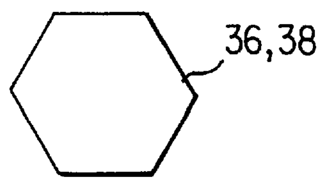
Figure 8D:
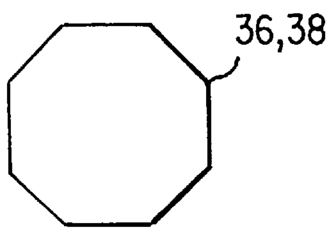
Figure 8E:
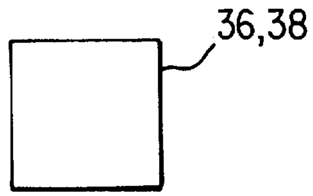

FIG. 7 shows the cart 10 of the second embodiment configured to carry only one kayak 22. In this configuration, the second arcuate tube 34 is rotated so that the ends 14 of both arcuate tubes 12 and 34 are adjacent one another and the projecting tubes 36 and 38 are fitted to one another. Now the kayak 22 is supported by both arcuate tubes 12 and 34, in a manner similar to the first embodiment. The second arcuate tube 34 is effectively positioned out of the way, and it is a simple matter to disconnect the two arcuate tubes 12 and 34, rotate arcuate tube 34 180°, and refit the projecting tubes 36 and 38 to form a cart for two watercraft.

Figure 9:
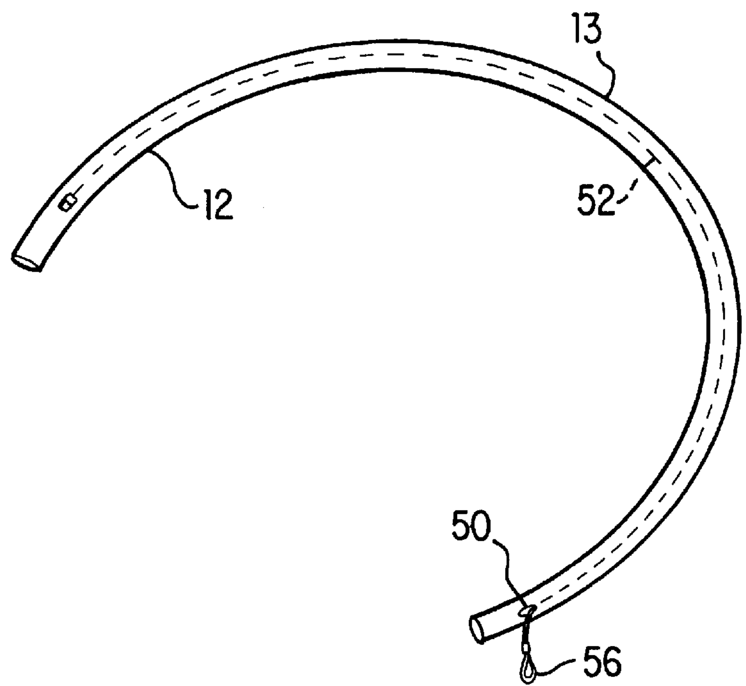
FIG. 9 is a perspective view of the arcuate tube shown in FIG. 1, illustrating a locking cable.

Referring to FIG. 9, a perspective view of the arcuate tube 12 is shown. A hole 50 is provided in the side of the arcuate tube 12. A cable 52 extends through the hole 50 and has a stop sleeve 54 at an end inside the arcuate tube 12. The stop sleeve 54 prevents the cable 52 from being completely withdrawn from the arcuate tube 12. A loop 56 is formed in the end of the cable 52 opposite the stop sleeve 54. The loop 56 allows the cart 10 to be easily locked. The cable 52 can be reinserted for storage and withdrawn for locking.

Having described several embodiments of the watercraft cart in accordance with the present invention, it is believed that other modifications, variations and changes will be suggested to those skilled in the art in view of the description set forth above, such as adding additional arcuate tubes for further watercraft, or padding all, or parts of the arcuate tubes to protect the hulls of the watercraft. It is therefor to be understood that all such variations, modifications and changes are believed to fall within the scope of the invention as defined in the appended claims.

What is claimed is:

1. A cart for transporting watercraft, having an elongate hull, comprising:

a substantially rigid first arcuate member having two laterally spaced ends, and a center section, the first arcuate member being disposed in a single plane with a radius of curvature greater than 180°;

two arms, one each of said two arms extending from one of said two ends of said first arcuate member;

two wheels, one each attached to each of said two arms; and wherein said cart is configured for receiving one end portion of said watercraft through said first arcuate member when said wheels are in engagement with a ground surface so that a bottom surface of said watercraft rests on said two ends of said first arcuate member, and said center section rests on a top surface of said watercraft.

2. A cart for transporting watercraft, as recited in claim 1, wherein said two arms and said first arcuate member are tubes.

3. A cart for transporting watercraft, as recited in claim 2, wherein said two arms and said first arcuate member are metal.

4. A cart for transporting watercraft, as recited in claim 1, wherein said two arms and said first arcuate member are disposed in substantially the same plane.

5. A cart for transporting watercraft, as recited in claim 4, wherein said plane formed by said two arms and said first arcuate member is disposed at an acute angle relative to a longitudinal axis of said watercraft.

6. A cart for transporting watercraft, as recited in claim 1, said first arcuate member extends approximately 270° in its radius of curvature.

7. A cart for transporting watercraft, as recited in claim 1, further comprising:

a second arcuate member having two ends and a center section;

a first projecting tube extending perpendicularly from said center section of said first arcuate member;

a second projecting tube extending perpendicularly from said center section of said second arcuate member; and wherein said first and second projecting tubes fit together, in at least two configurations.

8. A cart for transporting watercraft, as recited in claim 7, wherein said first and second projecting tubes fit together in a first configuration where said two ends of said first member are disposed 180° from said two ends of said second arcuate member.

9. A cart for transporting watercraft, as recited in claim 8, wherein said a second watercraft fits through said second arcuate member, said two ends of said second arcuate member resting on a top of said second watercraft, and a bottom of said second watercraft resting on said center section of said second arcuate member.

10. A cart for transporting watercraft, as recited in claim 9, wherein said second watercraft is substantially parallel to said watercraft in said first arcuate member.

11. A cart for transporting watercraft, as recited in claim 7, wherein said first and second projecting tubes fit together in a configuration where said first arcuate member and said second arcuate member are disposed adjacent one another with said two ends of said first arcuate member disposed adjacent said two ends of said second arcuate member.

12. A cart for transporting watercraft, as recited in claim 11, wherein said watercraft fits through said first and second arcuate members.

13. A cart for transporting watercraft, as recited in claim 11, wherein said first and second arcuate members can pivot relative to one another about said first and second projecting members.

14. A cart for transporting watercraft, as recited in claim 7, wherein said first arcuate member and said second arcuate member are disposed in substantially planer relationship.

15. A cart for transporting watercraft, as recited in claim 7, wherein cross-sections of said first and second projecting tubes are one of a rectangular cross-section, an oval cross-section, a hexagonal cross-section, and an octagonal cross-section.

16. A cart for transporting watercraft, as recited in claim 1, further comprising a cable disposed in, and extendable from, said first arcuate tube for locking said cart.

17. A cart for transporting watercraft, having an elongate hull, comprising:

a substantially rigid first arcuate metal member having two laterally spaced ends, and a center sections, the first arcuate member being disposed in a single plane with a radius of curvature greater than 180°;

two metal arms, one each of said two arms extending from one of said two ends of said first arcuate metal tube;

two wheels, one each attached to each of said two metal arms;

wherein said cart is configured for receiving one end portion of said watercraft through said first arcuate member when said wheels are in engagement with a ground surface, so that a bottom surface of said watercraft rests on said two ends of said first arcuate metal tube, and said center section rests on a top surface of said watercraft; and said plane formed by said two arms and said first arcuate member is disposed at an acute angle relative to a longitudinal axis of said watercraft.

18. A cart for transporting watercraft, as recited in claim 17, further comprising:

a second arcuate member having two ends and a center section;

a first projecting tube extending perpendicularly from said center section of said first arcuate member;

a second projecting tube extending perpendicularly from said center section of said second arcuate member, said first and second projecting tubes having one of a rectangular, a hexagonal, an octagonal, and an oval cross-section;

wherein said first and second projecting tubes fit together in a first configuration where said two ends of said first member are disposed 180° from said two ends of said second arcuate member; and wherein said first and second projecting tubes fit together in a second configuration where said first arcuate member and said second arcuate member are disposed adjacent one another with said two ends of said first arcuate member disposed adjacent said two ends of said second arcuate member.

19. A cart for transporting watercraft, as recited in claim 17, further comprising a cable disposed in, and extendable from, said first arcuate tube for locking said cart.

* * * * *